(12) United States Patent
Luo et al.

(10) Patent No.: US 9,718,225 B2
(45) Date of Patent: Aug. 1, 2017

(54) HEAT RESISTANT TOUGHENED THERMOPLASTIC COMPOSITION FOR INJECTION MOLDING

(71) Applicant: Ticona LLC, Florence, KY (US)

(72) Inventors: Rong Luo, Florence, KY (US); Kent Miller, Florence, KY (US); Xinyu Zhao, Florence, KY (US); Xiaoyan Tu, Florence, KY (US)

(73) Assignee: Ticona LLC, Florence, KY (US)

( * ) Notice: Subject to any disclaimer, the term of this patent is extended or adjusted under 35 U.S.C. 154(b) by 0 days.

(21) Appl. No.: 14/467,374

(22) Filed: Aug. 25, 2014

(65) Prior Publication Data

US 2015/0064437 A1 Mar. 5, 2015

Related U.S. Application Data

(60) Provisional application No. 61/870,356, filed on Aug. 27, 2013.

(51) Int. Cl.
*B32B 27/32* (2006.01)
*B27N 3/18* (2006.01)
(Continued)

(52) U.S. Cl.
CPC ...... *B29C 45/0005* (2013.01); *B29C 45/0001* (2013.01); *B65D 63/1027* (2013.01); *B29C 47/1081* (2013.01); *B29C 47/402* (2013.01); *B29C 47/767* (2013.01); *B29K 2021/003* (2013.01); *B29K 2081/04* (2013.01); *B29K 2105/0005* (2013.01); *B29K 2105/0032* (2013.01); *B29K 2105/0088* (2013.01); *B29K 2105/0094* (2013.01); *B29K 2105/16* (2013.01);
(Continued)

(58) Field of Classification Search
None
See application file for complete search history.

(56) References Cited

U.S. PATENT DOCUMENTS 3,184,439 A * 5/1965 Brack ................ C08G 18/4291
521/114
3,354,129 A 11/1967 Edmonds, Jr. et al.
(Continued)

FOREIGN PATENT DOCUMENTS

CA 2032370 6/1991
FR 2617176 12/1988
(Continued)

OTHER PUBLICATIONS

International Patent Application No. PCT/US2014/052462, International Search Report and Written Opinion, dated Nov. 6, 2014.

*Primary Examiner* — David Sample
*Assistant Examiner* — Nicole T Gugliotta
(74) *Attorney, Agent, or Firm* — Dority & Manning, P.A.

(57) ABSTRACT

Injection molded parts with a small dimension that exhibit high heat resistance are described. Thermoplastic compositions that can be utilized to form the injection molded parts are described. The thermoplastic composition includes a polyarylene sulfide and a crosslinked impact modifier. The thermoplastic composition can also include siloxane polymers, thermoplastic elastomers, or other additives that can further improve the characteristics of the injection molded parts.

26 Claims, 3 Drawing Sheets

(51) Int. Cl.
  *B65D 63/00*     (2006.01)
  *B65D 67/02*     (2006.01)
  *F16L 3/00*      (2006.01)
  *B29C 45/00*     (2006.01)
  *B65D 63/10*     (2006.01)
  *B29K 81/00*     (2006.01)
  *B29K 105/24*    (2006.01)
  *B29K 105/16*    (2006.01)
  *B29K 105/00*    (2006.01)
  *B29L 5/00*      (2006.01)
  *B29L 31/00*     (2006.01)
  *B29C 47/10*     (2006.01)
  *B29K 21/00*     (2006.01)
  *B29C 47/40*     (2006.01)
  *B29C 47/76*     (2006.01)
  *B29L 7/00*      (2006.01)

(52) U.S. Cl.
  CPC .. *B29K 2105/24* (2013.01); *B29K 2995/0016* (2013.01); *B29K 2995/0017* (2013.01); *B29K 2995/0082* (2013.01); *B29K 2995/0089* (2013.01); *B29L 2005/00* (2013.01); *B29L 2007/007* (2013.01); *B29L 2031/7276* (2013.01); *B29L 2031/7282* (2013.01); *Y10T 24/1498* (2015.01); *Y10T 24/44* (2015.01)

(56) References Cited

U.S. PATENT DOCUMENTS

| | | |
|---|---|---|
| 3,845,010 A | 10/1974 | Labana et al. |
| 3,919,177 A | 11/1975 | Campbell |
| 4,337,329 A | 6/1982 | Kubo et al. |
| 4,368,321 A | 1/1983 | Sherk et al. |
| 4,371,671 A | 2/1983 | Anderson |
| 4,384,081 A | 5/1983 | Kubo et al. |
| 4,452,951 A | 6/1984 | Kubo et al. |
| 4,464,515 A | 8/1984 | Rempel et al. |
| 4,503,196 A | 3/1985 | Rempel et al. |
| 4,581,417 A | 4/1986 | Buding et al. |
| 4,810,590 A | 3/1989 | Rich |
| 4,814,430 A | 3/1989 | Iwasaki et al. |
| 4,889,893 A | 12/1989 | Kobayashi et al. |
| 5,006,605 A | 4/1991 | Mizuno et al. |
| 5,047,465 A | 9/1991 | Auerbach |
| 5,087,666 A | 2/1992 | Yu et al. |
| 5,149,731 A | 9/1992 | Uota et al. |
| 5,240,973 A | 8/1993 | Katoh et al. |
| 5,240,988 A | 8/1993 | Kohler et al. |
| 5,248,730 A | 9/1993 | Yamao |
| 5,270,305 A | 12/1993 | Palmer |
| 5,380,783 A | 1/1995 | Satake et al. |
| 5,397,839 A | 3/1995 | Patel |
| 5,504,141 A | 4/1996 | Collard et al. |
| 5,578,679 A | 11/1996 | Suzuki et al. |
| 5,589,544 A | 12/1996 | Horrion |
| 5,625,002 A | 4/1997 | Kadoi et al. |
| 5,652,287 A | 7/1997 | Sullivan |
| 5,654,358 A | 8/1997 | Kadoi et al. |
| 5,668,214 A | 9/1997 | Suzuki |
| 5,817,723 A | 10/1998 | Flexman, Jr. et al. |
| 5,830,965 A | 11/1998 | Imaizumi et al. |
| 5,837,758 A | 11/1998 | Brown et al. |
| 5,840,830 A | 11/1998 | Miyahara et al. |
| 6,001,934 A | 12/1999 | Yamanaka et al. |
| 6,015,858 A | 1/2000 | Gornowicz |
| 6,020,431 A | 2/2000 | Venkataswamy et al. |
| 6,117,950 A | 9/2000 | Yamao et al. |
| 6,225,416 B1 | 5/2001 | Reil et al. |
| 6,281,286 B1 | 8/2001 | Chorvath et al. |
| 6,362,287 B1 | 3/2002 | Chorvath et al. |
| 6,417,293 B1 | 7/2002 | Chorvath et al. |
| 6,476,106 B1 * | 11/2002 | Murakami ............ C08K 5/5435 257/E23.12 |
| 6,538,071 B1 | 3/2003 | Fuchs |
| 6,569,955 B1 | 5/2003 | Brewer et al. |
| 6,569,958 B1 | 5/2003 | Gross et al. |
| 6,608,136 B1 | 8/2003 | Dean et al. |
| 6,649,704 B2 | 11/2003 | Brewer et al. |
| 6,653,437 B2 | 11/2003 | Hinokimori et al. |
| 6,657,014 B1 | 12/2003 | Mori et al. |
| 6,699,946 B1 * | 3/2004 | Lambla ................ C08L 81/02 525/189 |
| 6,713,569 B2 | 3/2004 | Chorvath et al. |
| 6,740,707 B2 | 5/2004 | Ono et al. |
| 6,740,709 B2 | 5/2004 | Ono et al. |
| 6,743,868 B2 | 6/2004 | Fournier et al. |
| 6,849,697 B2 | 2/2005 | Lambla et al. |
| 6,875,517 B2 | 4/2005 | Bosshammer et al. |
| 6,888,719 B1 | 5/2005 | Janzen et al. |
| 7,011,114 B2 | 3/2006 | Suzuki et al. |
| 7,041,741 B2 | 5/2006 | Patel et al. |
| 7,208,207 B2 | 4/2007 | Ono et al. |
| 7,442,744 B2 | 10/2008 | Tokushige et al. |
| 7,960,473 B2 | 6/2011 | Kobayashi et al. |
| 7,981,981 B2 | 7/2011 | Ajbani et al. |
| 9,493,646 B2 * | 11/2016 | Luo ...................... B32B 1/08 |
| 2003/0213939 A1 * | 11/2003 | Narayan ............. B82Y 10/00 252/500 |
| 2005/0119396 A1 | 6/2005 | Papke |
| 2005/0208248 A1 | 9/2005 | Ilo et al. |
| 2006/0229417 A1 | 10/2006 | Ferrate et al. |
| 2007/0004862 A1 * | 1/2007 | Park ...................... C08L 27/12 525/192 |
| 2010/0048777 A1 | 2/2010 | Kodama et al. |
| 2011/0114215 A1 | 5/2011 | Jeruzal et al. |
| 2011/0287201 A1 | 11/2011 | Abe et al. |
| 2012/0037397 A1 | 2/2012 | Mhetar |
| 2012/0217038 A1 | 8/2012 | Ajbani et al. |
| 2013/0059976 A1 | 3/2013 | Matsuo et al. |
| 2013/0225771 A1 * | 8/2013 | Kanomata ............ C08G 75/14 525/537 |
| 2013/0269819 A1 * | 10/2013 | Ruby .................... F16L 9/147 138/141 |
| 2013/0273286 A1 * | 10/2013 | Luo ...................... C08L 81/04 428/36.91 |
| 2013/0273287 A1 * | 10/2013 | Luo ...................... B32B 1/08 428/36.91 |
| 2013/0273288 A1 * | 10/2013 | Luo ...................... C08L 81/04 428/36.91 |
| 2013/0273289 A1 * | 10/2013 | Luo ...................... F16L 11/04 428/36.91 |
| 2013/0298353 A1 * | 11/2013 | Drane ................. B65D 63/1063 24/16 PB |
| 2014/0230887 A1 * | 8/2014 | Eguchi ................. C08K 5/521 136/252 |
| 2015/0111794 A1 * | 4/2015 | Zia ...................... B32B 27/286 508/106 |

FOREIGN PATENT DOCUMENTS

| | | |
|---|---|---|
| GB | 1558491 | 1/1980 |
| JP | 06-65376 A | 3/1994 |
| JP | 09-59514 A | 3/1997 |
| JP | 11-124476 A | 5/1999 |
| JP | 2001-115020 A | 4/2001 |
| JP | 2001-279097 A | 10/2001 |
| JP | 2004-300270 A | 10/2004 |
| JP | 3618018 B | 2/2005 |
| JP | 3889122 B | 3/2007 |
| JP | 2007-169550 A | 7/2007 |
| JP | 4235893 B | 3/2009 |
| JP | 4552434 B | 9/2010 |
| JP | 4600015 B | 12/2010 |
| JP | 4600016 B | 12/2010 |
| JP | 2011-020401 A | 2/2011 |
| JP | 5029881 B | 9/2012 |
| JP | 5051428 B | 10/2012 |
| WO | WO 91/18055 | 11/1991 |
| WO | WO 94/16018 | 7/1994 |
| WO | WO2012/0161134 | * 11/2011 ............ C08K 5/521 |

(56) References Cited

FOREIGN PATENT DOCUMENTS

| WO | WO 2012/057319 | * | 5/2012 | ............. | C08J 75/02 |
| WO | WO 2013/043566 | | 3/2013 | | |
| WO | WO 2013/066663 | | 5/2013 | | |

* cited by examiner

HEAT RESISTANT TOUGHENED THERMOPLASTIC COMPOSITION FOR INJECTION MOLDING

CROSS REFERENCE TO RELATED APPLICATION

The present application claims filing benefit of U.S. Provisional patent Application Ser. No. 61/870,356 having a filing date of Aug. 27, 2013, which is incorporated herein by reference in its entirety.

BACKGROUND OF THE INVENTION

Injection molded parts with small dimensional tolerances are in high demand in various industries (e.g., electronic, automotive, etc.). In these applications, the thermoplastic composition must have good flow properties so that it can quickly and uniformly fill the small spaces of the mold cavity. In addition, the formed part should exhibit desired qualities such as flexibility while withstanding expected stresses during use.

Injection molded polymer blends that exhibit flexibility in addition to high strength and resistance properties are of significant commercial interest. Such blends have been formed in the past by uniformly mixing an elastic component with a thermoplastic polyolefin such that the elastomer is intimately and uniformly dispersed as a discrete or co-continuous phase within a continuous phase of the polyolefin. Vulcanization of the composite crosslinks the components and provides improved temperature and chemical resistance to the composition. When vulcanization is carried out during combination of the various polymeric components it is termed dynamic vulcanization. Unfortunately, injection molded products of small dimensions formed from dynamically vulcanized polyolefin blends fail to provide the desired strength and resistance properties in many applications.

Polyarylene sulfides are high-performance polymers that may withstand high thermal, chemical, and mechanical stresses and are beneficially utilized in a wide variety of applications. Polyarylene sulfides have often been blended with other polymers to improve characteristics of the product composition. For example, elastomeric impact modifiers have been found beneficial for improvement of the physical properties of a thermoplastic composition. Compositions including blends of polyarylene sulfides with impact modifying polymers have been considered for high performance, high temperature applications.

Unfortunately, elastomeric polymers generally considered useful for impact modification are not compatible with polyarylene sulfides and phase separation has been a problem in forming compositions of the two. This can be particularly problematic when forming products having small dimensions. Attempts have been made to improve the composition formation, for instance through the utilization of compatibilizers. However, even upon such modifications, compositions including polyarylene sulfides in combination with impact modifying polymers still fail to provide product performance as desired, particularly in small dimension injection molded parts that require both high heat resistance and high impact resistance.

What are needed in the art are thermoplastic compositions that can be injection molded to form small dimension products that exhibit high strength characteristics as well as resistance to degradation, even in extreme temperature environments.

SUMMARY OF THE INVENTION

In accordance with one embodiment of the present invention, an injection molded part is disclosed. The part has a thickness of about 100 millimeters or less and is formed from a thermoplastic composition that comprises a polyarylene sulfide and a crosslinked impact modifier. The thermoplastic composition exhibits high toughness and good flexibility as well as excellent heat resistance. For instance, the injection molded part can exhibit a notched Charpy impact strength of about 3 kJ/m$^2$ or greater as measured according to ISO Test No. 179-1 at a temperature of 23° C. and the injection molded part can exhibit about 60% or more strength retention following heat aging at 165° for 1000 hours. Injection molded parts that can be formed from the thermoplastic composition can include fasteners such as clips, cable ties, cable tie saddles, and the like. The injection molded parts can be particularly well suited for use in extreme temperatures and/or in applications in which temperatures may vary over a wide margin.

Also disclosed is a method for forming an injection molded part from the thermoplastic composition. A method can include injecting a thermoplastic composition into a mold cavity. More specifically, the thermoplastic composition can include a polyarylene sulfide and a crosslinked impact modifier. The thermoplastic composition can have a melt viscosity of about 3 kilopoise or less as determined by a capillary rheometer at a temperature of 310° C. and shear rate of 1200 seconds$^{-1}$. The method can also include ejecting the molded part from the cavity, the molded part having a thickness of about 100 millimeters or less.

BRIEF DESCRIPTION OF THE FIGURES

The present disclosure may be better understood with reference to the following figures.

DETAILED DESCRIPTION

It is to be understood by one of ordinary skill in the art that the present discussion is a description of exemplary embodiments only, and is not intended as limiting the broader aspects of the present disclosure.

The present disclosure is generally directed to injection molded parts with a small dimension that exhibit excellent physical characteristics. Also disclosed are thermoplastic compositions that can be utilized to form the injection molded parts. Beneficially, the small dimension injection molded parts can maintain good physical characteristics even when utilized in extreme temperature applications such as high temperatures as may be encountered in automotive applications and low temperatures as may be encountered in piping applications. The thermoplastic composition can also maintain good physical characteristics under conditions in which the materials are subjected to extreme temperature fluctuations.

Generally speaking, the present invention is directed to an injection molded part that has a relatively small thickness and exhibits flexibility and high strength characteristics so that it can be readily employed in a wide variety of applications. For example, the part may be in the form of a substrate having a thickness of about 100 millimeters or less, in some embodiments about 50 millimeters or less, in some embodiments from about 100 micrometers to about 10 millimeters, and in some embodiments, from about 200 micrometers to about 1 millimeter. The part can have a length and/or width dimension that is larger than the thickness. For instance, the part can have a length dimension that is about 5 centimeters or greater, in some embodiments about 10 centimeters or greater, in some embodiments from about 5 centimeters to about 200 centimeters, and in some embodiments from about 10 centimeters to about 100 centimeters. In some embodiments the part can have an aspect ratio (length/width) that is about 1 or greater. For instance the part can have an aspect ratio that is about 5 or greater, in some embodiments the aspect ratio can be about 10 or greater, for instance from about 5 to about 500, or from about 10 to about 300.

Figure 1:
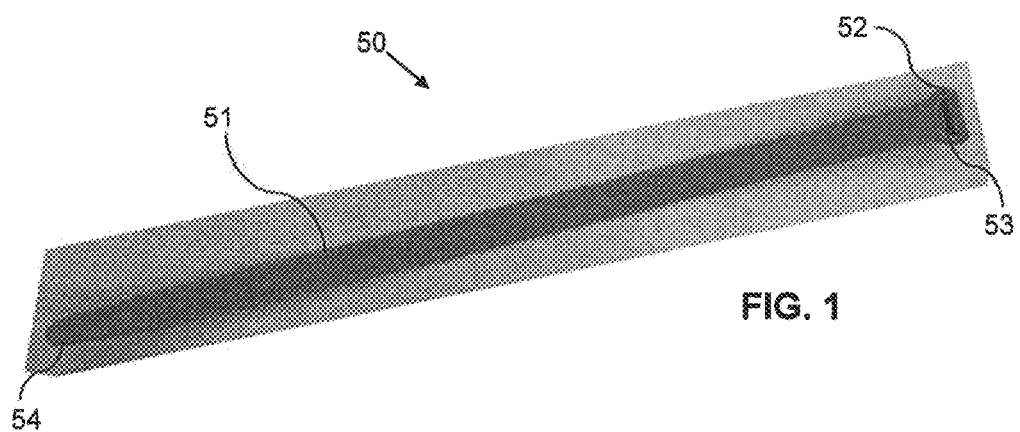
FIG. 1 is a representation of a cable tie that may be formed from the thermoplastic composition.
Figure 2:
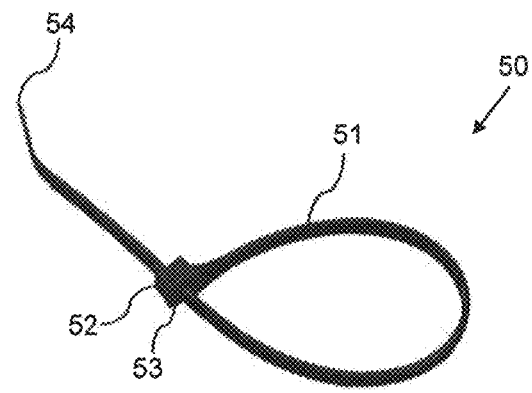
FIG. 2 is a representation of a cable tie following closure of the tie.

Examples of molded parts include, for instance, fasteners as may be beneficially utilized in a variety of applications. Exemplary fasteners can include cable ties, clips, bands, harnesses, tapes, cable tie saddles, and so forth. FIG. 1 illustrates a cable tie 50 as may be formed. As can be seen the cable tie 50 includes a tape section 51. The tape section 51 can include a series of teeth that slope in one direction. The head 52 of the cable tie defines a slot 53. The slot 53 can be sized such that distal end 54 of the tape section 51 can fit into the slot 53. In the illustrated embodiment, the end 54 is tapered, which can facilitate feeding the end 54 into the slot 53, but this is not a requirement of the cable tie. The slot 53 of the head 52 also includes a pawl that can irreversibly ride up the teeth of the tape section 52 when the tape section 52 is fed through the slot 53. The pawl engages the backside of the teeth to stop movement of the tape in the reversal direction and thus preventing opening of the cable tie. FIG. 2 illustrates the cable tie 50 following closure. As can be seen the tape section 51 is fed through the slot 53 of the head 52 to irreversibly close. The cable tie 50 can be conveniently utilized to fasten structures (e.g., pipes, wires, cables, ropes, etc.) to one another.

Figure 3A:
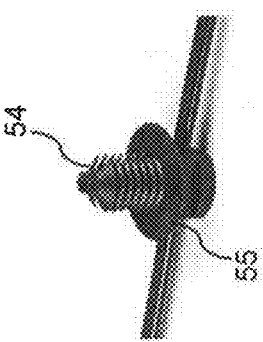
FIG. 3A, FIG. 3B and FIG. 3C illustrate examples of other products that can be formed from the thermoplastic composition.

Of course, a large variety of products are encompassed in the present disclosure and the disclosure is in no way limited to cable ties as illustrated in FIG. 2. Modified cable ties are also encompassed herein. For example, FIG. 3A illustrates a fir tree mount cable tie as may be formed from the thermoplastic composition. A fir tree mount cable tie is useful in a variety of applications, and particularly in blind assembly applications as the fir tree 54 can be located within the receiving disc 55 merely by feel if necessary. The staggered design of the fir tree 54 provides low insertion forces and high extraction forces so as to prevent release following utilization of the fir tree mount cable tie.

Figure 3B:
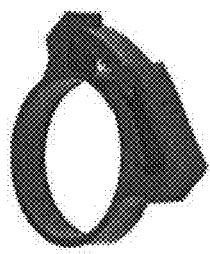
Figure 3C:
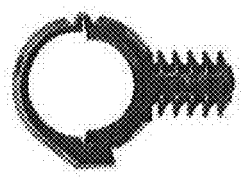

Other applications of the thermoplastic composition can include clamps such as the hose clamp illustrated in FIG. 3B and the tube clip illustrated in FIG. 3C. Products formed from the thermoplastic composition such as the clamps and clips illustrated herein can provide secure attachment under adverse conditions, and particularly under high temperature applications as may be found in, e.g., automobile engine applications.

To achieve the desired properties of the molded parts, the parts can be formed from a melt processed thermoplastic composition that includes a polyarylene sulfide. More specifically, the thermoplastic composition can be formed by combining a polyarylene sulfide with an impact modifier to form a mixture and subjecting the mixture to dynamic vulcanization. During formation of the thermoplastic composition, the polyarylene sulfide can be combined with the impact modifier and this mixture can be subjected to shear conditions such that the impact modifier becomes well distributed throughout the polyarylene sulfide. Following formation of the mixture, a polyfunctional crosslinking agent can be added. The polyfunctional crosslinking agent can react with the components of the mixture to form crosslinks in the composition, for instance within and between the polymer chains of the impact modifier.

Without being bound to any particular theory, it is believed that by adding the polyfunctional crosslinking agent to the thermoplastic composition following distribution of the impact modifier throughout the polyarylene sulfide, interaction between the polyarylene sulfide, the impact modifier, and the crosslinking agent within the melt processing unit can be improved, leading to improved distribution of the crosslinked impact modifier throughout the composition. The improved distribution of the crosslinked impact modifier throughout the composition can improve the strength and flexibility characteristics of the composition, e.g., the ability of the composition to maintain strength under deformation, as well as provide a composition with good processibility that can be utilized to form a product that can exhibit excellent resistance to degradation under a variety of conditions.

According to one embodiment, a formation process can include functionalization of the polyarylene sulfide. This embodiment can provide additional sites for bonding between the impact modifier and the polyarylene sulfide, which can further improve distribution of the impact modifier throughout the polyarylene sulfide and further prevent phase separation. Moreover, functionalization of the polyarylene sulfide can include scission of the polyarylene sulfide chain, which can decrease the melt viscosity of the composition and improve processibility. This can also provide a composition that is a low halogen composition, e.g., low chlorine composition that exhibits excellent physical characteristics and high resistance to degradation.

To provide further improvements to the thermoplastic composition, the composition can be formed to include other additives. For instance, the composition can include one or more additional polymers such as a silicone polymer or a thermoplastic elastomer. In those embodiments in which the thermoplastic composition includes another polymer in conjunction with the other components, for instance a silicone polymer, it may also prove beneficial to include a coupling agent that can improve bonding between the additional polymer and the polyarylene sulfide. The composition can also include traditional additives such as fillers, lubricants, colorants, etc. according to standard practice.

The high strength, flexibility, and heat resistant characteristics of the thermoplastic composition can be evident by examination of the tensile, flexural, and/or impact properties of the materials. For example, the thermoplastic composition (or the injection molded part formed from the composition) can have a notched Charpy impact strength of greater than about 3 kJ/m², greater than about 3.5 kJ/m², greater than about 5 kJ/m², greater than about 10 kJ/m², greater than about 15 kJ/m², greater than about 30 kJ/m², greater than about 33 kJ/m², greater than about 40 kJ/m², greater than about 45 kJ/m², or greater than about 50 kJ/m² as determined according to ISO Test No. 179-1 (technically equivalent to ASTM D256, Method B) at 23° C. The unnotched Charpy samples do not break under testing conditions of ISO Test No. 180 at 23° C. (technically equivalent to ASTM D256).

Beneficially, the thermoplastic composition can maintain good physical characteristics even at extreme temperatures, including both high and low temperatures. For instance, the thermoplastic composition (or the injection molded part formed from the composition) can have a notched Charpy impact strength of greater than about 8 kJ/m², greater than about 9 kJ/m², greater than about 10 kJ/m², greater than about 14 kJ/m², greater than about 15 kJ/m², greater than about 18 kJ/m², or greater than about 20 kJ/m² as determined according to ISO Test No. 179-1 at −30° C.; and can have a notched Charpy impact strength of greater than about 8 kJ/m², greater than about 9 kJ/m², greater than about 10 kJ/m², greater than about 11 kJ/m², greater than about 12 kJ/m², or greater than about 15 kJ/m² as determined according to ISO Test No. 179-1 at −40° C.

Moreover, the effect of temperature change on the thermoplastic composition can be surprisingly small. For instance, the ratio of the notched Charpy impact strength as determined according to ISO Test No. 179-1 at 23° C. to that at −30° C. can be greater than about 3.5, greater than about 3.6, or greater than about 3.7. Thus, and as described in more detail in the example section below, as the temperature increases the impact strength of the thermoplastic composition also increases, as expected, but the rate of increase of the impact strength is very high, particularly as compared to a composition that does not include the dynamically crosslinked impact modifier. Accordingly, the thermoplastic composition can exhibit excellent strength characteristics at a wide range of temperatures.

The thermoplastic composition can also exhibit excellent heat resistance and thus can be utilized continuously at high temperature, for instance at a continuous use temperature of up to about 150° C., about 160° C., or about 165° C. without loss of tensile strength. For instance, the an injection molded part formed of the thermoplastic composition can exhibit about 60% or more strength retention, about 65% or more strength retention, or about 70% or more strength retention following heat aging at 165° C. for 1000 hours. In one embodiment, the thermoplastic composition can maintain greater than about 95%, for instance about 100% of the original tensile strength after 1000 hours of heat aging at 135° C. and can maintain greater than about 95%, for instance about 100% of the original tensile elongation at yield after 1000 hours heat aging at 135° C.

The thermoplastic composition can also exhibit flame retardant characteristics. For instance, the composition can meet the V-0 flammability standard at a thickness of 0.2 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

| Rating | Afterflame Time (s) | Burning Drips | Burn to Clamp |
| --- | --- | --- | --- |
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.2 millimeters.

The thermoplastic composition may possess a relatively low melt viscosity, which allows it to readily flow into the mold cavity during production of the part. For instance, the composition may have a melt viscosity of about 3 kilopoise or less, in some embodiments about 2 kilopoise or less, and in some embodiments, from about 0.1 to about 1 kilopoise, as determined by a capillary rheometer at a temperature of 310° C. and shear rate of 1200 seconds$^{-1}$. Among other things, these viscosity properties can allow the composition to be readily injection molded into parts having very small dimensions without producing excessive amounts of flash. Moreover, the thermoplastic composition can exhibit improved melt stability over time as compared to thermoplastic compositions that do not include crosslinked impact modifiers. Thermoplastic compositions that do not include a crosslinked impact modifier tend to exhibit an increase in melt viscosity over time, and in contrast, disclosed compositions can maintain or even decrease in melt viscosity over time.

The thermoplastic composition can have a complex viscosity as determined at low shear (0.1 radians per second (rad/s)) and 310° C. of greater than about 10 kPa·sec, greater than about 25 kPa·sec, greater than about 40 kPa·sec, greater than about 50 kPa·sec, greater than about 75 kPa·sec, greater than about 200 kPa·sec, greater than about 250 kPa·sec, greater than about 300 kPa·sec, greater than about 350 kPa·sec, greater than about 400 kPa·sec, or greater than about 450 kPa·sec. Higher value for complex viscosity at low shear is indicative of the crosslinked structure of the composition and the higher melt strength of the thermoplastic composition. In addition, the thermoplastic composition can exhibit high shear sensitivity, which indicates excellent characteristics for use in formation processes such as blow molding and extrusion processing.

The thermoplastic composition (and the part formed from the composition) can exhibit very good tensile characteristics. For example, the thermoplastic composition can have a tensile elongation at yield of greater than about 4.5%, greater than about 6%, greater than about 7%, greater than about 10%, greater than about 25%, greater than about 35%, greater than about 50%, greater than about 70%, greater than about 75%, greater than about 80%, or greater than about 90%. Similarly, the tensile elongation at break can be quite high, for instance greater than about 10%, greater than about 25%, greater than about 35%, greater than about 50%, greater than about 70%, greater than about 75%, greater than about 80%, or greater than about 90%. The strain at break can be greater than about 5%, greater than about 15%, greater than about 20%, or greater than about 25%. For instance the strain at break can be about 90%. The yield strain can likewise be high, for instance greater than about 5%, greater than about 15%, greater than about 20%, or greater than about 25%. The yield stress can be, for example, greater than about 50% or greater than about 53%. The thermoplastic composition may have a tensile strength at break of greater than about 30 MPa, greater than about 35 MPa, greater than about 40 MPa, greater than about 45 MPa, or greater than about 70 MPa.

In addition, the thermoplastic composition can have a relatively low tensile modulus. For instance, the thermoplastic composition can have a tensile modulus less than about 3000 MPa, less than about 2300 MPa, less than about 2000 MPa, less than about 1500 MPa, or less than about 1100 MPa as determined according to ISO Test No. 527 at a temperature of 23° C. and a test speed of 5 mm/min.

The thermoplastic composition can exhibit good characteristics after annealing as well. For instance, following annealing at a temperature of about 230° C. for a period of time of about 2 hours, the tensile modulus of the composition can be less than about 2500 MPa, less than about 2300 MPa, or less than about 2250 MPa. The tensile strength at break after annealing can be greater than about 50 MPa, or greater than about 55 MPa, as measured according to ISO Test No. 527 at a temperature of 23° C. and a test speed of 5 mm/min.

Tensile characteristics can be determined according to ISO Test No. 527 at a temperature of 23° C. and a test speed of 5 mm/min or 50 mm/min (technically equivalent to ASTM D623 at 23° C.).

The flexural characteristics of the composition can be determined according to ISO Test No. 178 (technically equivalent to ASTM D790 at a temperature of 23° C. and a testing speed of 2 mm/min. For example, the flexural modulus of the composition can be about 2500 MPa or less, about 2300 MPa or less, about 2000 MPa or less, about 1800 MPa or less, or about 1500 MPa or less. The thermoplastic composition may have a flexural strength at break of about 30 MPa or greater, about 35 MPa or greater, about 40 MPa or greater, about 45 MPa or greater, or about 70 MPa or greater.

The deflection temperature under load of the thermoplastic composition can be relatively high. For example, the deflection temperature under load of the thermoplastic composition can be greater than about 80° C., greater than about 90° C., greater than about 100° C., or greater than about 105° C., as determined according to ISO Test No. 75-2 (technically equivalent to ASTM D790) at 1.8 MPa.

The Vicat softening point can be greater than about 200° C. or greater than about 250° C., for instance about 270° C. as determined according to the Vicat A test when a load of 10 N is used at a heating rate of 50 K/hr. For the Vicat B test, when a load of 50 N is used at a heating rate of 50 K/hr, the Vicat softening point can be greater than about 100° C., greater than about 150° C. greater than about 175° C., or greater than about 190° C., for instance about 200° C. The Vicat softening point can be determined according to ISO Test No. 306 (technically equivalent to ASTM D1525).

The thermoplastic composition can also exhibit excellent stability during long term exposure to harsh environmental conditions. For instance, under long term exposure to an acidic environment, the thermoplastic composition can exhibit little loss in strength characteristics. For instance, following 500 hours exposure to a strong acid (e.g., a solution of about 5% or more strong acid such as sulfuric acid, hydrochloric acid, nitric acid, perchloric acid, etc.), the thermoplastic composition can exhibit a loss in Charpy notched impact strength of less than about 17%, or less than about 16% following exposure of about 500 hours to a strong acid solution at a temperature of about 40° C., and can exhibit a loss in Charpy notched impact strength of less than about 25%, or less than about 22% following exposure of about 500 hours to a strong acid solution at a temperature of about 80° C. Even under harsher conditions, for instance in a 10% sulfuric acid solution held at a temperature of about 80° C. for 1000 hours, the thermoplastic composition can maintain about 80% or more of the initial Charpy notched impact strength. The thermoplastic composition can also maintain desirable strength characteristics following exposure to other potentially degrading materials, such as salts, e.g., road salts as may be encountered in automotive applications.

Figure 4:
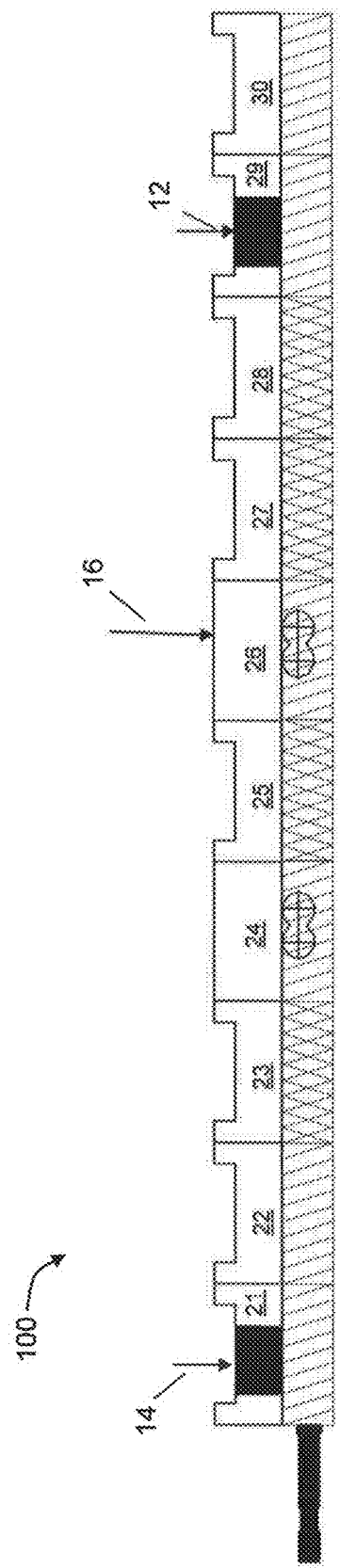
FIG. 4 is a schematic representation of a process for forming the thermoplastic composition as disclosed herein.

FIG. 4 illustrates a schematic of a process that can be used in forming the thermoplastic composition. As illustrated, the components of the thermoplastic composition may be melt-kneaded in a melt processing unit such as an extruder 100. Extruder 100 can be any extruder as is known in the art including, without limitation, a single, twin, or multi-screw extruder, a co-rotating or counter rotating extruder, an intermeshing or non-intermeshing extruder, and so forth. In one embodiment, the composition may be melt processed in an extruder 100 that includes multiple zones or barrels. In the illustrated embodiment, extruder 100 includes 10 barrels numbered 21-30 along the length of the extruder 100, as shown. Each barrel 21-30 can include feed lines 14, 16, vents 12, temperature controls, etc. that can be independently operated. A general purpose screw design can be used to melt process the polyarylene composition. By way of example, a thermoplastic composition may be melt mixed using a twin screw extruder such as a Coperion co-rotating fully intermeshing twin screw extruder.

In forming a thermoplastic composition, the polyarylene sulfide can be fed to the extruder 100 at a main feed throat 14. For instance, the polyarylene sulfide may be fed to the main feed throat 14 at the first barrel 21 by means of a metering feeder. The polyarylene sulfide can be melted and mixed with the other components of the composition as it progresses through the extruder 100. The impact modifier can be added to the composition in conjunction with the thermoplastic composition at the main feed throat 14 or downstream of the main feed throat, as desired.

At a point downstream of the main feed throat 14, and following addition of the impact modifier to the composition, the crosslinking agent can be added to the composition. For instance, in the illustrated embodiment, a second feed line 16 at barrel 26 can be utilized for addition of the crosslinking agent. The point of addition for the crosslinking agent is not particularly limited. However, the crosslinking agent can be added to the composition at a point after the polyarylene sulfide has been mixed with the impact modifier under shear such that the impact modifier is well distributed throughout the polyarylene sulfide.

The polyarylene sulfide may be a polyarylene thioether containing repeat units of the formula (I):

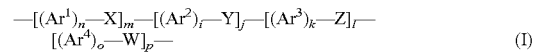

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from $-SO_2-$, $-S-$, $-SO-$, $-CO-$, $-O-$, —COO— or alkylene or alkylidene groups of 1 to 6 carbon atoms and wherein at least one of the linking groups is —S—; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide typically includes more than about 30 mol %, more than about 50 mol %, or more than about 70 mol % arylene sulfide (—S—) units. In one embodiment the polyarylene sulfide includes at least 85 mol % sulfide linkages attached directly to two aromatic rings.

In one embodiment, the polyarylene sulfide is a polyphenylene sulfide, defined herein as containing the phenylene sulfide structure —$(C_6H_4$—$S)_n$— (wherein n is an integer of 1 or more) as a component thereof.

The polyarylene sulfide may be synthesized prior to forming the thermoplastic composition, though this is not a requirement of a process, and a polyarylene sulfide can also be purchased from known suppliers. For instance Fortron® polyphenylene sulfide available from Ticona of Florence, Ky., USA can be purchased and utilized as the polyarylene sulfide.

Synthesis techniques that may be used in making a polyarylene sulfide are generally known in the art. By way of example, a process for producing a polyarylene sulfide can include reacting a material that provides a hydrosulfide ion, e.g., an alkali metal sulfide, with a dihaloaromatic compound in an organic amide solvent.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide may be a homopolymer or may be a copolymer. By a suitable, selective combination of dihaloaromatic compounds, a polyarylene sulfide copolymer can be formed containing not less than two different units. For instance, in the case where p-dichlorobenzene is used in combination with m-dichlorobenzene or 4,4'-dichlorodiphenylsulfone, a polyarylene sulfide copolymer can be formed containing segments having the structure of formula (II):

(II)

and segments having the structure of formula (III):

(III)

or segments having the structure of formula (IV):

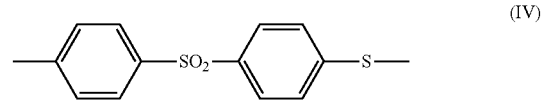

(IV)

In general, the amount of the dihaloaromatic compound(s) per mole of the effective amount of the charged alkali metal sulfide can generally be from 1.0 to 2.0 moles, from 1.05 to 2.0 moles, or from 1.1 to 1.7 moles. Thus, the polyarylene sulfide can include alkyl halide (generally alkyl chloride) end groups.

A process for producing the polyarylene sulfide can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than about 50 mol % of the theoretically necessary amount.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level of the polyarylene sulfide. The duration of the second polymerization step can be, e.g., from about 0.5 to about 20 hours, or from about 1 to about 10 hours.

The polyarylene sulfide may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide may include a small amount of a branching unit or a cross-linking unit, but the amount of branching or cross-linking units may be less than about 1 mol % of the total monomer units of the polyarylene sulfide. A linear polyarylene sulfide polymer may be a random copolymer or a block copolymer containing the above-mentioned repeating unit.

A semi-linear polyarylene sulfide may be utilized that may have a cross-linking structure or a branched structure provided by introducing into the polymer a small amount of one or more monomers having three or more reactive functional groups. For instance between about 1 mol % and about 10 mol % of the polymer may be formed from monomers having three or more reactive functional groups. Methods that may be used in making semi-linear polyarylene sulfide are generally known in the art. By way of example, monomer components used in forming a semi-linear polyarylene sulfide can include an amount of polyhaloaromatic compounds having 2 or more halogen substituents per molecule which can be utilized in preparing branched polymers. Such monomers can be represented by the formula R'$X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Following polymerization, the polyarylene sulfide may be washed with liquid media. For instance, the polyarylene sulfide may be washed with water and/or organic solvents that will not decompose the polyarylene sulfide including, without limitation, acetone, N-methyl-2-pyrrolidone, a salt solution, and/or an acidic media such as acetic acid or hydrochloric acid prior to combination with other components while forming the mixture. The polyarylene sulfide can be washed in a sequential manner that is generally known to persons skilled in the art. Washing with an acidic solution or a salt solution may reduce the sodium, lithium or calcium metal ion end group concentration from about 2000 ppm to about 100 ppm.

A polyarylene sulfide can be subjected to a hot water washing process. The temperature of a hot water wash can be at or above about 100° C., for instance higher than about 120° C., higher than about 150° C., or higher than about 170° C.

The polymerization reaction apparatus for forming the polyarylene sulfide is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide may be discharged from the reactor, typically through an extrusion orifice fitted with a die of desired configuration, cooled, and collected. Commonly, the polyarylene sulfide may be discharged through a perforated die to form strands that are taken up in a water bath, pelletized and dried. The polyarylene sulfide may also be in the form of a strand, granule, or powder.

The thermoplastic composition may include the polyarylene sulfide component (which also encompasses a blend of polyarylene sulfides) in an amount from about 10 wt. % to about 99 wt. % by weight of the composition, for instance from about 20% wt. % to about 90 wt. % by weight of the composition.

According to one embodiment, the polyarylene sulfide can be functionalized to further encourage bond formation between the polyarylene sulfide and the impact modifier and other additives as may be included in the composition. For instance, a polyarylene sulfide can be further treated following formation with a carboxyl, acid anhydride, amine, isocyanate or other functional group-containing modifying compound to provide a functional terminal group on the polyarylene sulfide. By way of example, a polyarylene sulfide can be reacted with a modifying compound containing a mercapto group or a disulfide group and also containing a reactive functional group. In one embodiment, the polyarylene sulfide can be reacted with the modifying compound in an organic solvent. In another embodiment, the polyarylene sulfide can be reacted with the modifying compound in the molten state.

In one embodiment, a disulfide compound containing the desired functional group can be incorporated into the thermoplastic composition formation process, and the polyarylene sulfide can be functionalized in conjunction with formation of the composition. For instance, a disulfide compound containing the desired reactive functional groups can be added to the melt extruder in conjunction with the polyarylene sulfide or at any other point prior to or in conjunction with the addition of the crosslinking agent.

Reaction between the polyarylene sulfide polymer and the reactively functionalized disulfide compound can include chain scission of the polyarylene sulfide polymer that can decrease melt viscosity of the polyarylene sulfide. In one embodiment, a higher melt viscosity polyarylene sulfide having low halogen content can be utilized as a starting polymer. Following reactive functionalization of the polyarylene sulfide polymer by use of a functional disulfide compound, a relatively low melt viscosity polyarylene sulfide with low halogen content can be formed. Following this chain scission, the melt viscosity of the polyarylene sulfide can be suitable for the injection molding, and the overall halogen content of the low melt viscosity polyarylene sulfide can be quite low. In one embodiment, the thermoplastic composition can have a halogen content of less than about 1000 ppm, less than about 900 ppm, less than about 600 ppm, or less than about 400 ppm as determined according to an elemental analysis using Parr Bomb combustion followed by Ion Chromatography.

The disulfide compound can generally have the structure of:

wherein $R^1$ and $R^2$ may be the same or different and are hydrocarbon groups that independently include from 1 to about 20 carbons. For instance, $R^1$ and $R^2$ may be an alkyl, cycloalkyl, aryl, or heterocyclic group. $R^1$ and $R^1$ may include reactive functionality at terminal end(s) of the disulfide compound. For example, at least one of $R^1$ and $R^2$ may include a terminal carboxyl group, hydroxyl group, a substituted or non-substituted amino group, a nitro group, or the like. In general, the reactive functionality can be selected such that the reactively functionalized polyarylene sulfide can react with the impact modifier. For example, when considering an epoxy-terminated impact modifier, the disulfide compound can include carboxyl and/or amine functionality.

Examples of disulfide compounds including reactive terminal groups as may be encompassed herein may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

The ratio of the amount of the polyarylene sulfide to the amount of the disulfide compound can be from about 1000:1 to about 10:1, from about 500:1 to about 20:1, or from about 400:1 to about 30:1.

In addition to the polyarylene sulfide polymer, the composition also includes an impact modifier. More specifically, the impact modifier can be an olefinic copolymer or terpolymer. For instance, the impact modifier can include ethylenically unsaturated monomer units have from about 4 to about 10 carbon atoms.

The impact modifier can be modified to include functionalization so as to react with the crosslinking agent. For instance, the impact modifier can be modified with a mole fraction of from about 0.01 to about 0.5 of one or more of the following: an α, β unsaturated dicarboxylic acid or salt thereof having from about 3 to about 8 carbon atoms; an α, β unsaturated carboxylic acid or salt thereof having from about 3 to about 8 carbon atoms; an anhydride or salt thereof having from about 3 to about 8 carbon atoms; a monoester or salt thereof having from about 3 to about 8 carbon atoms; a sulfonic acid or a salt thereof; an unsaturated epoxy compound having from about 4 to about 11 carbon atoms. Examples of such modification functionalities include maleic anhydride, fumaric acid, maleic acid, methacrylic acid, acrylic acid, and glycidyl methacrylate. Examples of metallic acid salts include the alkaline metal and transitional metal salts such as sodium, zinc, and aluminum salts.

A non-limiting listing of impact modifiers that may be used include ethylene-acrylic acid copolymer, ethylene-maleic anhydride copolymers, ethylene-alkyl (meth)acrylate-maleic anhydride terpolymers, ethylene-alkyl(meth)acrylate-glycidyl (meth)acrylate terpolymers, ethylene-acrylic ester-methacrylic acid terpolymer, ethylene-acrylic ester-maleic anhydride terpolymer, ethylene-methacrylic acid-methacrylic acid alkaline metal salt (ionomer) terpolymers, and the like. In one embodiment, for instance, an impact modifier can include a random terpolymer of ethylene, methylacrylate, and glycidyl methacrylate. The terpolymer can have a glycidyl methacrylate content of from about 5% to about 20%, such as from about 6% to about 10%. The terpolymer may have a methylacrylate content of from about 20% to about 30%, such as about 24%.

According to one embodiment, the impact modifier may be a linear or branched, homopolymer or copolymer (e.g., random, graft, block, etc.) containing epoxy functionalization, e.g., terminal epoxy groups, skeletal oxirane units, and/or pendent epoxy groups. For instance, the impact modifier may be a copolymer including at least one monomer component that includes epoxy functionalization. The monomer units of the impact modifier may vary. In one embodiment, for example, the impact modifier can include epoxy-functional methacrylic monomer units. As used herein, the term methacrylic generally refers to both acrylic and methacrylic monomers, as well as salts and esters thereof, e.g., acrylate and methacrylate monomers. Epoxy-functional methacrylic monomers as may be incorporated in the impact modifier may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

Other monomer units may additionally or alternatively be a component of the impact modifier. Examples of other monomers may include, for example, ester monomers, olefin monomers, amide monomers, etc. In one embodiment, the impact modifier can include at least one linear or branched α-olefin monomer, such as those having from 2 to 20 carbon atoms, or from 2 to 8 carbon atoms. Specific examples include ethylene; propylene; 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene.

Monomers included in an impact modifier that includes epoxy functionalization can include monomers that do not include epoxy functionalization, as long as at least a portion of the monomer units of the polymer are epoxy functionalized.

In one embodiment, the impact modifier can be a terpolymer that includes epoxy functionalization. For instance, the impact modifier can include a methacrylic component that includes epoxy functionalization, an α-olefin component, and a methacrylic component that does not include epoxy functionalization. For example, the impact modifier may be poly(ethylene-co-methylacrylate-co-glycidyl methacrylate), which has the following structure:

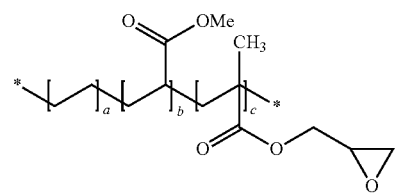

wherein, a, b, and c are 1 or greater.

In another embodiment the impact modifier can be a random copolymer of ethylene, ethyl acrylate and maleic anhydride having the following structure:

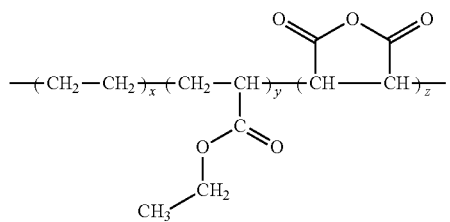

wherein x, y and z are 1 or greater.

The relative proportion of the various monomer components of a copolymeric impact modifier is not particularly limited. For instance, in one embodiment, the epoxy-functional methacrylic monomer components can form from about 1 wt. % to about 25 wt. %, or from about 2 wt. % to about 20 wt % of a copolymeric impact modifier. An a-olefin monomer can form from about 55 wt. % to about 95 wt. %, or from about 60 wt. % to about 90 wt. %, of a copolymeric impact modifier. When employed, other monomeric components (e.g., a non-epoxy functional methacrylic monomers) may constitute from about 5 wt. % to about 35 wt. %, or from about 8 wt. % to about 30 wt. %, of a copolymeric impact modifier.

An impact modifier may be formed according to standard polymerization methods as are generally known in the art. For example, a monomer containing polar functional groups may be grafted onto a polymer backbone to form a graft copolymer. Alternatively, a monomer containing functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

Alternatively, an impact modifier may be obtained on the retail market. By way of example, suitable compounds for use as an impact modifier may be obtained from Arkema under the name Lotader®.

The molecular weight of the impact modifier can vary widely. For example, the impact modifier can have a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7.

In general, the impact modifier may be present in the composition in an amount from about 0.05% to about 40% by weight, from about 0.05% to about 37% by weight, or from about 0.1% to about 35% by weight.

Referring again to FIG. 4, the impact modifier can be added to the composition in conjunction with the polyarylene sulfide at the main feed throat 14 of the melt processing unit. This is not a requirement of the composition formation process, however, and in other embodiments, the impact modifier can be added downstream of the main feed throat. For instance, the impact modifier may be added at a location downstream from the point at which the polyarylene sulfide is supplied to the melt processing unit, but yet prior to the melting section, i.e., that length of the melt processing unit in which the polyarylene sulfide becomes molten. In another embodiment, the impact modifier may be added at a location downstream from the point at which the polyarylene sulfide becomes molten.

If desired, one or more distributive and/or dispersive mixing elements may be employed within the mixing section of the melt processing unit. Suitable distributive mixers for single screw extruders may include but are not limited to, for instance, Saxon, Dulmage, Cavity Transfer mixers, etc. Likewise, suitable dispersive mixers may include but are not limited to Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin mixers.

In addition to the polyarylene sulfide and the impact modifier, the polyarylene composition can include a crosslinking agent. The crosslinking agent can be a polyfunctional compound or combination thereof that can react with functionality of the impact modifier to form crosslinks within and among the polymer chains of the impact modifier. In general, the crosslinking agent can be a non-polymeric compound, i.e., a molecular compound that includes two or more reactively functional terminal moieties linked by a bond or a non-polymeric (non-repeating) linking component. By way of example, the crosslinking agent can include but is not limited to di-epoxides, poly-functional epoxides, diisocyanates, polyisocyanates, polyhydric alcohols, water-soluble carbodiimides, diamines, diaminoalkanes, polyfunctional carboxylic acids, diacid halides, and so forth. For instance, when considering an epoxy-functional impact modifier, a non-polymeric polyfunctional carboxylic acid or amine can be utilized as a crosslinking agent.

Specific examples of polyfunctional carboxylic acid crosslinking agents can include, without limitation, isophthalic acid, terephthalic acid, phthalic acid, 1,2-di(p-carboxyphenyl)ethane, 4,4'-dicarboxydiphenyl ether, 4,4'-bisbenzoic acid, 1,4- or 1,5-naphthalene dicarboxylic acids, decahydronaphthalene dicarboxylic acids, norbornene dicarboxylic acids, bicyclooctane dicarboxylic acids, 1,4-cyclohexanedicarboxylic acid (both cis and trans), 1,4-hexylenedicarboxylic acid, adipic acid, azelaic acid, dicarboxyl dodecanoic acid, succinic acid, maleic acid, glutaric acid, suberic acid, azelaic acid and sebacic acid. The corresponding dicarboxylic acid derivatives, such as carboxylic acid diesters having from 1 to 4 carbon atoms in the alcohol radical, carboxylic acid anhydrides or carboxylic acid halides may also be utilized.

Exemplary diols useful as crosslinking agents can include, without limitation, aliphatic diols such as ethylene glycol, 1,2-propylene glycol, 1,3-propylene glycol, 2,2-dimethyl-1,3-propane diol, 2-ethyl-2-methyl-1,3-propane diol, 1,4-butane diol, 1,4-but-2-ene diol, 1,3-1,5-pentane diol, 1,5-pentane diol, dipropylene glycol, 2-methyl-1,5-pentane diol, and the like. Aromatic diols can also be utilized such as, without limitation, hydroquinone, catechol, resorcinol, methylhydroquinone, chlorohydroquinone, bisphenol A, tetrachlorobisphenol A, phenolphthalein, and the like. Exemplary cycloaliphatic diols as may be used include a cycloaliphatic moiety, for example 1,6-hexane diol, dimethanol decalin, dimethanol bicyclooctane, 1,4-cyclohexane dimethanol (including its cis- and trans-isomers), triethylene glycol, 1,10-decanediol, and the like.

Exemplary diamines that may be utilized as crosslinking agents can include, without limitation, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6- toluoylene-diamine, 3,5-diethyl-2,4- and/or -2,6-toluoylene-diamine, and primary ortho- di-, tri- and/or tetra-alkyl-substituted 4,4'-diaminodiphenyl-methanes, (cyclo)aliphatic diamines, such as, for example, isophorone-diamine, ethylenediamine, 1,2-, 1,3-propylene-diamine, N-methyl-1,3-propylene-diamine, N,N'-dimethyl-ethylene-diamine, and aromatic diamines, such as, for example, 2,4- and 2,6-toluoylene-diamine, 3,5-diethyl-2,4- and/or -2,6-toluoylene-diamine, and primary ortho- di-, tri- and/or tetra-alkyl-substituted 4,4'-diaminodiphenyl-methanes.

In one embodiment, the composition can include a disulfide-free crosslinking agent. For example, the crosslinking agent can include carboxyl and/or amine functionality with no disulfide group that may react with the polyarylene sulfide. A crosslinking agent that is disulfide-free can be utilized so as to avoid excessive chain scission of the polyarylene sulfide by the crosslinking agent during formation of the composition. It should be understood, however, that the utilization of a disulfide-free crosslinking agent does not in any way limit the utilization of a reactively functionalized disulfide compound for functionalizing the polyarylene sulfide. For instance, in one embodiment, the composition can be formed according to a process that includes addition of a reactively functionalized disulfide compound to the melt processing unit that can reactively functionalize the polyarylene sulfide. The crosslinking agent utilized in this embodiment can then be a disulfide-free crosslinking agent that can include functionality that is reactive with the impact modifier as well as with the reactively functionalized polyarylene sulfide. Thus, the composition can be highly crosslinked without excessive scission of the polyarylene sulfide polymer chains.

In another embodiment the crosslinking agent and the polyarylene sulfide functionalization compound (when present) can be selected so as to encourage chain scission of the polyarylene sulfide. This may be beneficial, for instance, which chain scission is desired to decrease the melt viscosity of the polyarylene sulfide polymer.

The thermoplastic composition may generally include the crosslinking agent in an amount from about 0.05 wt. % to about 2 wt. % by weight of the thermoplastic composition, from about 0.07 wt. % to about 1.5 wt. % by weight of the thermoplastic composition, or from about 0.1 wt. % to about 1.3 wt. %.

The crosslinking agent can be added to the melt processing unit following mixing of the polyarylene sulfide and the impact modifier. For instance, as illustrated in FIG. 4, the crosslinking agent can be added to the composition at a downstream location 16 following addition of polyarylene sulfide and the impact modifier (either together or separately) to the melt processing unit. This can ensure that the impact modifier has become dispersed throughout the polyarylene sulfide prior to addition of the crosslinking agent.

To help encourage distribution of the impact modifier throughout the melt prior to addition of the crosslinking agent, a variety of different parameters may be selectively controlled. For example, the ratio of the length ("L") to diameter ("D") of a screw of the melt processing unit may be selected to achieve an optimum balance between throughput and impact modifier distribution. For example, the L/D value after the point at which the impact modifier is supplied may be controlled to encourage distribution of the impact modifier. More particularly, the screw has a blending length ("$L_B$") that is defined from the point at which both the impact modifier and the polyarylene sulfide are supplied to the unit (i.e., either where they are both supplied in conjunction with one another or the point at which the latter of the two is supplied) to the point at which the crosslinking agent is supplied, the blending length generally being less than the total length of the screw. For example, when considering a melt processing unit that has an overall L/D of 40, the $L_B$/D ratio of the screw can be from about 1 to about 36, in some embodiments from about 4 to about 20, and in some embodiments, from about 5 to about 15. In one embodiment, the L/$L_B$ ratio can be from about 40 to about 1.1, from about 20 to about 2, or from about 10 to about 5.

Following addition of the crosslinking agent, the composition can be mixed to distribute the crosslinking agent throughout the composition and encourage reaction between the crosslinking agent, the impact modifier, and, in one embodiment, with the polyarylene sulfide.

Optionally, the thermoplastic composition can include one or more additional polymers. For instance, in one embodiment the thermoplastic composition can also include a siloxane polymer. The siloxane polymer can encompass any polymer, co-polymer or oligomer that includes siloxane units in the backbone having the formula:

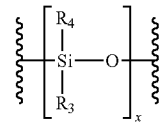

wherein $R_3$ and $R_4$ are independently of one another, hydrogen, alkyl, alkenyl, acyl, alkaryl or aralkyl having up to 20 carbon atoms. In one embodiment the siloxane polymer includes reactive functionality on at least a portion of the siloxane monomer units of the polymer. The backbone of the siloxane polymer can include substitutions as is known in the art such as alkyl substitutions, phenyl substitutions, etc.

Some examples of suitable siloxane polymers include, without limitation, polydimethyl siloxanes such as dimethylvinylsiloxy end group-capped polydimethyl siloxane, methyldivinylsiloxy end group-capped polydimethyl siloxane, dimethylvinylsiloxy end group-capped dimethyl siloxane, (80 mol %)/methylphenylsiloxane (20 mol %) copolymers, dimethylvinylsiloxy end group-capped dimethylsiloxane (80 mol %)/diphenylsiloxane (20 mol %) copolymers, dimethylvinylsiloxy end group-capped dimethylsiloxane (90 mol %)/diphenylsiloxane (10 mol %) copolymers, and trimethylsiloxy end group-capped dimethylsiloxane/methylvinylsiloxane copolymers. Besides the above-mentioned polymers, other polymers may also be utilized. For instance, some suitable vinyl-modified silicones include, but are not limited to, vinyldimethyl terminated polydimethylsiloxanes; vinylmethyl, dimethylpolysiloxane copolymers; vinyldimethyl terminated vinylmethyl, dimethylpolysiloxane copolymers; divinylmethyl terminated polydimethylsiloxanes; polydimethylsiloxane, mono vinyl, mono n-butyldimethyl terminated; and vinylphenylmethyl terminated polydimethylsiloxanes. Further, some methyl-modified silicones that can be used include, but are not limited to, dimethylhydro terminated polydimethylsiloxanes; methylhydro, dimethylpolysiloxane copolymers; methylhydro terminated methyloctyl siloxane copolymers; and methylhydro, phenylmethyl siloxane copolymers.

When included, the reactive functionality of the siloxane polymer can include, without limitation, one or more of vinyl groups, hydroxyl groups, hydrides, isocyanate groups, epoxy groups, acid groups, halogen atoms, alkoxy groups (e.g., methoxy, ethoxy and propoxy), acyloxy groups (e.g., acetoxy and octanoyloxy), ketoximate groups (e.g., dimethylketoxime, methylketoxime and methylethylketoxime), amino groups (e.g., dimethylamino, diethylamino and butylamino), amido groups (e.g., N-methylacetamide and N-ethylacetamide), acid amido groups, amino-oxy groups, mercapto groups, alkenyloxy groups (e.g., vinyloxy, isopropenyloxy, and 1-ethyl-2-methylvinyloxy), alkoxyalkoxy groups (e.g., methoxyethoxy, ethoxyethoxy and methoxypropoxy), aminoxy groups (e.g., dimethylaminoxy and diethylaminoxy), mercapto groups, and the like.

The siloxane polymer can have any desired molecular weight. For example, in one embodiment, the siloxane polymer can have a molecular weight of greater than about 5000. In one embodiment, a high molecular weight siloxane polymer can be incorporated in the thermoplastic composition, e.g., a high molecular weight polydimethylsiloxane that can have more than about 200 —$(CH_3)_2SiO$— repeating units along the backbone. In another embodiment, an ultrahigh molecular weight siloxane polymer, e.g., an ultrahigh molecular weight polydimethylsiloxane can be incorporated in the thermoplastic composition that can have a number average molecular weight of about $10^6$ grams per mole or greater.

In one embodiment, the siloxane polymer can be epoxy-functionalized and can include epoxy groups incorporated into the siloxane polymer having the formula:

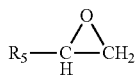

wherein $R_5$ is a divalent aliphatic ($C_1$-$C_{10}$), cycloalkyl($C_5$-$C_{20}$) heterocyclic ($C_4$-$C_9$), substituted or unsubstituted aromatic ($C_6$-$C_9$) hydrocarbon radical or a direct bond.

The epoxy groups can be incorporated onto an amine-functionalized or amino-terminated siloxane. For instance, an amine-terminated siloxane polymer such as those available commercially as the "G series" siloxane resins available from the General Electric Company can be reactively functionalized with epoxy. Epoxy functionalization may be carried out via reaction with an epoxy-containing compound such as an epoxy chlorotriazine as is known.

One example of a suitable epoxy chlorotriazine as may be utilized is trimethylglycidyl cyanuric chloride.

Reaction between the epoxy chlorotriazine and the siloxane may be conducted in an organic solvent such as toluene, methylene chloride, or other organic liquid of similar polarity. Reaction temperatures in the range of about 20° C. to about 100° C. may be employed. Excess amounts of the epoxy chlorotriazine are typically employed, which fall in the range of between about 1% and about 6% or between about 2% and about 6% by weight of the siloxane polymer.

A siloxane polymer can be mercapto-functionalized and can include mercapto groups incorporated into the siloxane polymer having the formula:

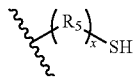

wherein $R_5$ is as described above. For example, the siloxane polymer can be a mercapto-functionalized polydimethyl siloxane having the general formula:

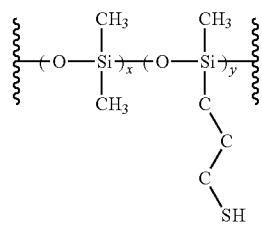

When incorporated in the thermoplastic composition, the composition can include a siloxane polymer in an amount of about 40 wt. % or less of the thermoplastic composition. For instance, the thermoplastic composition can include a siloxane polymer in an amount of from about 0.05 wt. % to about 35 wt. %, or about 0.1 wt. % to about 30 wt. %. A siloxane polymer can be incorporated in the thermoplastic composition at any point during the formation process, for instance in the main feed in conjunction with the polyarylene sulfide or downstream.

In combination with the siloxane polymer, the thermoplastic composition can include fumed silica. Fumed silica can generally have a particle size of from about 5 nanometers to about 50 nanometers. The particles are non-porous and can have a surface area of from about 50 square meters per gram ($m^2$/g) to about 600 $m^2$/g and a density of from about 160 kilogram per cubic meter ($kg/m^3$) to about 190 $kg/m^3$. When incorporated in the thermoplastic composition, the composition can include fumed silica in an about of less than about 25 wt. %, for instance from about 0.05 wt % to about 20 wt. %. In one embodiment, the fumed silica can be combined with the siloxane polymer prior to addition of this mixture to the thermoplastic composition. For instance a mixture including an ultrahigh molecular weight polydimethylsiloxane and fumed silica can be incorporated in the thermoplastic composition. Such a pre-formed mixture is available as Genioplast® from Wacker Chemie, AG.

The composition can include a coupling agent, for instance in conjunction with the siloxane polymer and can function to form bonds between and among the siloxane polymer and/or to couple the siloxane polymer to other components of the composition, such as the polyarylene sulfide, in one embodiment. The coupling agent can be any coupling agent as is known in the art that includes a silicon, zirconium, titanate, or other multireactive group chemistry. In one embodiment, the coupling agent can be an organosilane coupling agent, and in particular may be an alkoxy silane coupling agent as is known in the art including monoalkoxy silanes, dialkoxysilanes, chorlor silanes, and the like. For example, silane coupling agents available from Gelest, Inc. of Morrisville, Pa. can be utilized. The alkoxysilane compound may be a silane compound selected from, and without limitation to, vinlyalkoxysilanes, epoxyalkoxysilanes, aminoalkoxysilanes, mercaptoalkoxysilanes, and combinations thereof. Examples of the vinylalkoxysilane that may be utilized include vinyltriethoxysilane, vinyltrimethoxysilane and vinyltris(1-methoxyethoxy)silane. Examples of the epoxyalkoxysilanes that may be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that may be employed include γ-mercaptopropyltrimethoxysilane and γ-mercaptopropyltriethoxysilane.

Amino silane compounds that may be included are typically of the formula: $R^7$—Si—$(R^8)_3$, wherein $R^7$ is selected from the group consisting of an amino group such as $NH_2$;

an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^8$ is an alkoxy group of from about 1 to about 10 atoms, or from about 2 to about 5 carbon atoms, such as methoxy, ethoxy, propoxy, and so forth.

In one embodiment, $R^7$ is selected from the group consisting of aminomethyl, aminoethyl, aminopropyl, ethylene, ethyne, propylene and propyne, and $R^8$ is selected from the group consisting of methoxy groups, ethoxy groups, and propoxy groups. In another embodiment, $R^7$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^8$ is an alkoxy group of from about 1 to about 10 atoms, such as methoxy group, ethoxy group, propoxy group, and so forth. A combination of various aminosilanes may also be included in the polyarylene sulfide composition.

Some representative examples of amino silane coupling agents that may be included in the polyarylene sulfide composition include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl)tetraethoxy disiloxane, and combinations thereof. The amino silane may also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

Beneficially, a relatively small amount of the silane coupling agent can be incorporated into the thermoplastic composition, which can be very cost effective. For example, the polyarylene sulfide composition can include less than about 3% by weight of the silane coupling agent, for instance between about 0.05% and about 3% by weight of the silane coupling agent. In one embodiment, the composition can include from about 0.1% to about 2.5%, or from about 1% to about 2% by weight of the silane coupling agent.

In one embodiment the thermoplastic composition can incorporate a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to conventional elastomers, which harden slowly upon heating. Thermoplastic elastomers may be processed on injection molders and extruders and thus can be beneficially incorporated in the thermoplastic composition.

The thermoplastic elastomer can be a block copolymer in which at least one phase is made of a material that is hard at room temperature but fluid upon heating. Another phase is a softer material that is rubber-like at room temperature. The thermoplastic elastomer can have an A-B-A block copolymer structure, where A represents hard segments and B is a soft segment. In another embodiment, the thermoplastic elastomer can have a repeating structure represented by $(A-B)_n$, where A represents the hard segments and B the soft segments as described above.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Triblock elastomers can be utilized with polystyrene as the hard segment and either polybutadiene, polyisoprene, or polyethylene-co-butylene as the soft segment. Similarly, styrene butadiene repeating co-polymers can be utilized, as well as polystyrene/polyisoprene repeating polymers.

In one particular embodiment, a thermoplastic elastomer can be used that has alternating blocks of polyamide and polyether. Such materials are commercially available, for example from Atofina under the Pebax™ trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

When included, the thermoplastic composition can include the thermoplastic elastomer in an amount of about 40 wt. % or less of the thermoplastic composition. For instance, the thermoplastic composition can include a siloxane polymer in an amount of from about 0.05 wt. % to about 35 wt. %, or about 0.1 wt. % to about 30 wt. %.

The composition can also include one or more additives as are generally known in the art. For example, one or more fillers can be included in the thermoplastic composition. One or more fillers may generally be included in the thermoplastic composition an amount of from about 5 wt. % to about 70 wt. %, or from about 20 wt. % to about 65 wt. % by weight of the thermoplastic composition.

The filler can be added to the thermoplastic composition according to standard practice. For instance, the filler can be added to the composition at a downstream location of the melt processing unit. For example, a filler may be added to the composition in conjunction with the addition of the crosslinking agent. However, this is not a requirement of a formation process and the filler can be added separately from the crosslinking agent and either upstream or downstream of the point of addition of the crosslinking agent. In addition, a filler can be added at a single feed location, or may be split and added at multiple feed locations along the melt processing unit.

In one embodiment, a fibrous filler can be included in the thermoplastic composition. The fibrous filler may include one or more fiber types including, without limitation, polymer fibers, glass fibers, carbon fibers, metal fibers, basalt fibers, and so forth, or a combination of fiber types. In one embodiment, the fibers may be chopped fibers, continuous fibers, or fiber rovings (tows).

Fiber sizes can vary as is known in the art. In one embodiment, the fibers can have an initial length of from about 3 mm to about 5 mm. In another embodiment, for instance when considering a pultrusion process, the fibers can be continuous fibers. Fiber diameters can vary depending upon the particular fiber used. The fibers, for instance, can have a diameter of less than about 100 μm, such as less than about 50 μm. For instance, the fibers can be chopped or continuous fibers and can have a fiber diameter of from about 5 μm to about 50 μm, such as from about 5 μm to about 15 μm.

The fibers may be pretreated with a sizing as is generally known. In one embodiment, the fibers may have a high yield or small K numbers. The tow is indicated by the yield or K number. For instance, glass fiber tows may have 50 yield and up, for instance from about 115 yield to about 1200 yield.

Other fillers can alternatively be utilized or may be utilized in conjunction with a fibrous filler. For instance, a particulate filler can be incorporated in the thermoplastic composition. In general, particulate fillers can encompass any particulate material having a median particle size of less than about 750 μm, for instance less than about 500 μm, or less than about 100 μm. In one embodiment, a particulate filler can have a median particle size in the range of from about 3 μm to about 20 μm. In addition, a particulate filler can be solid or hollow, as is known. Particulate fillers can also include a surface treatment, as is known in the art.

Particulate fillers can encompass one or more mineral fillers. For instance, the thermoplastic composition can include one or more mineral fillers in an amount of from about 1 wt. % to about 60 wt. % of the composition. Mineral fillers may include, without limitation, silica, quartz powder, silicates such as calcium silicate, aluminum silicate, kaolin, talc, mica, clay, diatomaceous earth, wollastonite, calcium carbonate, and so forth.

When incorporating multiple fillers, for instance a particulate filler and a fibrous filler, the fillers may be added together or separately to the melt processing unit. For instance, a particulate filler can be added to the main feed with the polyarylene sulfide or downstream prior to addition of a fibrous filler, and a fibrous filler can be added further downstream of the addition point of the particulate filler. In general, a fibrous filler can be added downstream of any other fillers such as a particulate filler, though this is not a requirement.

In one embodiment, the thermoplastic composition can include a UV stabilizer as an additive. For instance, the thermoplastic composition can include a UV stabilizer in an amount of between about 0.5 wt. % and about 15 wt. %, between about 1 wt. % and about 8 wt. %, or between about 1.5 wt. % and about 7 wt. % of a UV stabilizer. One particularly suitable UV stabilizer that may be employed is a hindered amine UV stabilizer. Suitable hindered amine UV stabilizer compounds may be derived from a substituted piperidine, such as alkyl-substituted piperidyl, piperidinyl, piperazinone, alkoxypiperidinyl compounds, and so forth. For example, the hindered amine may be derived from a 2,2,6,6-tetraalkylpiperidinyl. The hindered amine may, for example, be an oligomeric or polymeric compound having a number average molecular weight of about 1,000 or more, in some embodiments from about 1000 to about 20,000, in some embodiments from about 1500 to about 15,000, and in some embodiments, from about 2000 to about 5000. Such compounds typically contain at least one 2,2,6,6-tetraalkylpiperidinyl group (e.g., 1 to 4) per polymer repeating unit. One particularly suitable high molecular weight hindered amine is commercially available from Clariant under the designation Hostavin® N30 (number average molecular weight of 1200). Another suitable high molecular weight hindered amine is commercially available from Adeka Palmarole SAS under the designation ADK STAB® LA-63 and ADK STAB® LA-68.

In addition to the high molecular hindered amines, low molecular weight hindered amines may also be employed. Such hindered amines are generally monomeric in nature and have a molecular weight of about 1000 or less, in some embodiments from about 155 to about 800, and in some embodiments, from about 300 to about 800.

Other suitable UV stabilizers may include UV absorbers, such as benzotriazoles or benzopheones, which can absorb UV radiation.

An additive that may be included in a thermoplastic composition is one or more colorants as are generally known in the art. For instance, the thermoplastic composition can include from about 0.1 wt. % to about 10 wt. %, or from about 0.2 wt. % to about 5 wt. % of one or more colorants. As utilized herein, the term "colorant" generally refers to any substance that can impart color to a material. Thus, the term "colorant" encompasses both dyes, which exhibit solubility in an aqueous solution, and pigments, that exhibit little or no solubility in an aqueous solution.

Examples of dyes that may be used include, but are not limited to, disperse dyes. Suitable disperse dyes may include those described in "Disperse Dyes" in the Color Index, $3^{rd}$ edition. Such dyes include, for example, carboxylic acid group-free and/or sulfonic acid group-free nitro, amino, aminoketone, ketoninime, methine, polymethine, diphenylamine, quinoline, benzimidazole, xanthene, oxazine and coumarin dyes, anthraquinone and azo dyes, such as mono- or di-azo dyes. Disperse dyes also include primary red color disperse dyes, primary blue color disperse dyes, and primary yellow color dyes.

Pigments that can be incorporated in a thermoplastic composition can include, without limitation, organic pigments, inorganic pigments, metallic pigments, phosphorescent pigments, fluorescent pigments, photochromic pigments, thermochromic pigments, iridescent pigments, and pearlescent pigments. The specific amount of pigment can depends upon the desired final color of the product. Pastel colors are generally achieved with the addition of titanium dioxide white or a similar white pigment to a colored pigment.

Other additives that can be included in the thermoplastic composition can encompass, without limitation, antimicrobials, lubricants, antioxidants, stabilizers (e.g., heat stabilizers including organophosphites such as Doverphos® products available from Dover Chemical Corporation), surfactants, flow promoters, solid solvents, and other materials added to enhance properties and processability. Such optional materials may be employed in the thermoplastic composition in conventional amounts and according to conventional processing techniques, for instance through addition to the thermoplastic composition at the main feed throat. Beneficially, the thermoplastic composition can exhibit desirable characteristics without the addition of plasticizers. For instance, the composition can be free of plasticizers such as phthalate esters, trimellitates, sebacates, adipates, gluterates, azelates, maleates, benzoates, and so forth.

Following addition of all components to the thermoplastic composition, the composition is thoroughly mixed in the remaining section(s) of the extruder and extruded through a die. The final extrudate can be pelletized or directly injection molded.

The method of the present invention includes the injection of the thermoplastic composition into a mold cavity where it is cooled until reaching the desired ejection temperature. As is known in the art, injection can occur in two main phases—i.e., an injection phase and holding phase. During the injection phase, the mold cavity is completely filled with the molten thermoplastic composition. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Figure 5:
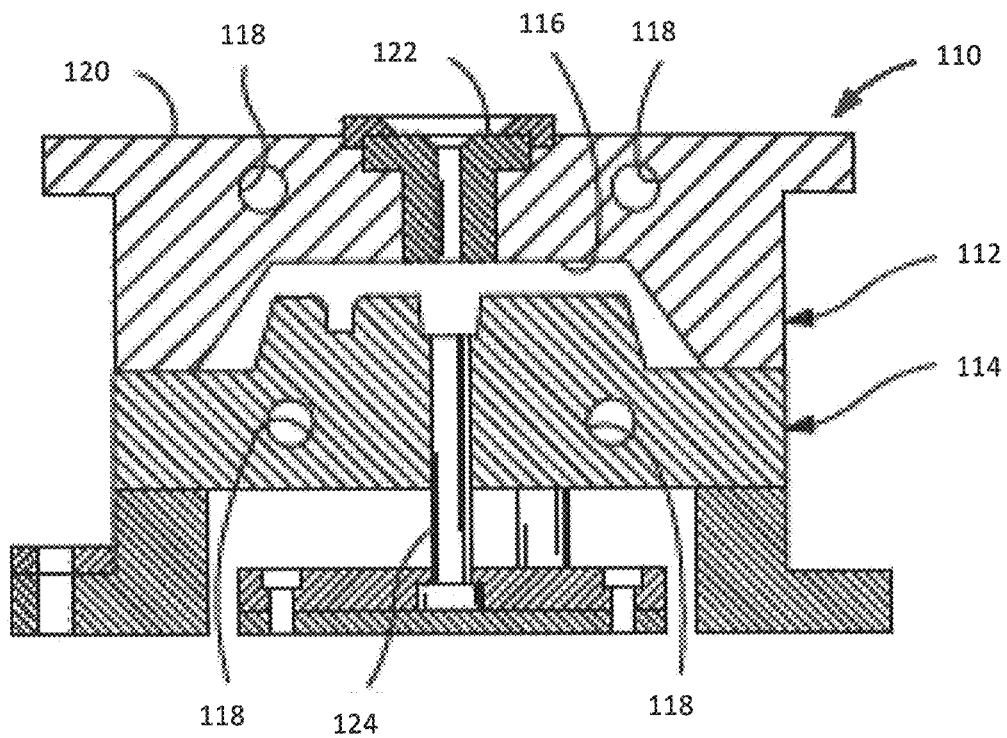
FIG. 5 is a cross-sectional view of one embodiment of an injection mold apparatus that may be employed in the present invention.

Any suitable injection molding equipment may generally be employed in the present invention. Referring to FIG. 5, for example, one embodiment of an injection molding apparatus or tool 110 that may be employed in the present invention is shown. In this embodiment, the apparatus 110 includes a first mold base 112 and a second mold base 114, which together define an article or component-defining mold cavity 116. The molding apparatus 110 also includes a resin flow path that extends from an outer exterior surface 120 of the first mold half 112 through a sprue 122 to a mold cavity 116. The resin flow path may also include a runner and a gate, both of which are not shown for purposes of simplicity. The thermoplastic composition may be supplied to the resin flow path using a variety of techniques. For example, the thermoplastic composition may be supplied (e.g., in the form of pellets) to a feed hopper attached to an extruder barrel that contains a rotating screw (not shown). As the screw rotates, the pellets are moved forward and undergo pressure and friction, which generates heat to melt the pellets. Additional heat may also be supplied to the composition by a heating medium that is communication with the extruder barrel. One or more ejector pins 124 may also be employed that are slidably secured within the second mold half 114 to define the mold cavity 116 in the closed position of the apparatus 110. The ejector pins 124 operate in a well-known fashion to remove a molded part from the cavity 116 in the open position of the molding apparatus 110.

A cooling mechanism may also be provided to solidify the resin within the mold cavity. In FIG. 5, for instance, the mold bases 112 and 114 each include one or more cooling lines 118 through which a cooling medium flows to impart the desired mold temperature to the surface of the mold bases for solidifying the molten material.

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

TEST METHODS

Tensile Properties: Tensile properties including tensile modulus, yield stress, yield strain, strength at break, elongation at yield, elongation at break, etc. are tested according to ISO Test No. 527 (technically equivalent to ASTM D638). Modulus, strain, and strength measurements are made on the same test strip sample having a length of 80 mm, thickness of 10 mm, and width of 4 mm. The testing temperature is 23° C., and the testing speeds are 5 or 50 mm/min.

Notched Charpy Impact Strength: Notched Charpy properties are tested according to ISO Test No. ISO 179-1) (technically equivalent to ASTM D256, Method B). This test is run using a Type A notch (0.25 mm base radius) and Type 1 specimen size (length of 80 mm, width of 10 mm, and thickness of 4 mm). Specimens are cut from the center of a multi-purpose bar using a single tooth milling machine. The testing temperature is 23° C., −30° F., or −40° F. as reported below.

Example 1

A polyphenylene sulfide (Fortron® 0214, available from Ticona) was tumble blended with a mixture of an ultrahigh molecular weight polydimethylsiloxane and fumed silica (Genioplast® Pellet S available from Wacker Chemie AG) and in one sample also with an aminosilane coupling agent. The mixture was melt extruded through a WLE-25 mm at 310° C. and pelletized. The formulation and mechanical property testing results are shown in the table, below.

|  | Sample No. | | |
|---|---|---|---|
|  | 1 | 2 | 3 |
| Components |  |  |  |
| Polyphenylene sulfide | 100 | 90 | 89.6 |
| Polydimethylsiloxane w/fumed silica | — | 10 | 10 |
| Aminosilane | — | — | 0.4 |
| Mechanical Properties |  |  |  |
| Tensile elongation at break (%) | 2.7 | 9.3 | 33.6 |
| Charpy Notched Impact Strength (23° C., kJ/m$^2$) | 2.1 | 2.7 | 6.5 |

As can be seen, the addition of 10 wt. % of the ultrahigh molecular weight polydimethylsiloxane/fumed silica combination led to an increase in tensile elongation and break and a slight increase in impact strength. The further addition of the coupling agent increased both tensile elongation at break and impact strength.

Example 2

Materials utilized to form the compositions included the following:

Polyarylene sulfide:

PPS1-Fortron® 0203 polyphenylene sulfide available from Ticona Engineering Polymers of Florence, Ky.

PPS2-Fortron® 0205 polyphenylene sulfide available from Ticona Engineering Polymers of Florence, Ky.

PPS3-Fortron® 0214 polyphenylene sulfide available from Ticona Engineering Polymers of Florence, Ky.

Impact Modifier: LOTADER® AX8840—a random copolymer of ethylene and glycidyl methacrylate available from Arkema, Inc.

Crosslinking Agent: Terephthalic Acid

Lubricant: Glycolube® P available from Lonza Group Ltd.

Pigment: Black Concentrate

Filler: Fiber glass 910A-10C 4 mm, available from Owens Corning, Inc.

Samples were formed by blending the ingredients and melt extruding through a WLE-25 mm at 310° C. followed by pelletizing. Sample formulations (provided as weight percentage of the formulation) and testing results are provided in the table below.

|  | Samples | | |
| --- | --- | --- | --- |
|  | 1 | 2 | 3 |
| Components | | | |
| PPS1 | — | — | 10.00 |
| PPS2 | — | 81.20 | 71.20 |
| PPS3 | 81.20 | — | — |
| Lubricant | 0.30 | 0.30 | 0.30 |
| Impact Modifier | 15.00 | 15.00 | 15.00 |
| Crosslinking agent | 1.00 | 1.00 | 0.70 |
| Pigment | 2.50 | 2.50 | 2.50 |
| Filler | — | — | 5.00 |
| Mechanical Properties | | | |
| Tensile Modulus (MPa 50 mm/min) | 2200 | 2300 | 3500 |
| Tensile Stress at Break (MPa) | 51.1 | 55.6 | 77.8 |
| Tensile Elongation at Break (%) | 12.4 | 26.3 | 4.5 |
| Charpy Notched Impact Strength (23° C., kJ/m$^2$) | 38.7 | 12.5 | 4.8 |

As can be seen, the combination of the polyarylene sulfide with the impact modifier and the crosslinking agent can produce materials with high elongation at break and impact strength. The addition of 5 wt. % glass fiber increased the tensile modulus and the tensile stress at break.

Figure 6:
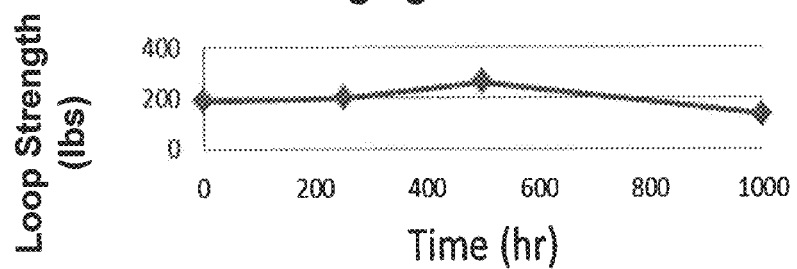
FIG. 6 graphically illustrates the loop strength retention of an injection molded cable tie during heat aging.

Sample 2 was injection molded to form cable ties as illustrated in FIG. 1 and FIG. 2. The cable ties were 0.5 inches wide by 15 inches long. The cable ties were tested for loop strength retention during heat aging and chemical resistance. Results of the strength retention are shown in FIG. 6 and chemical resistance results are shown in the table, below.

| Fluid | Sample 2 |
| --- | --- |
| Engine oil | ✓* |
| Gasoline | ✓ |
| Gasohol | ✓ |
| Diesel Fuel | ✓ |
| Power Steering Fluid | ✓ |
| Automatic Transmission Fluid | ✓ |
| Battery Acid | ✓ |
| Brake Fluid | ✓ |

*No degradation or change in appearance observed after 72 hours

Heat aging of the cable ties was performed at 165° C. for 1000 hours. After 1000 hours, the cable ties had 71% retention in loop strength.

Chemical resistance was determined by performing the Fluids Resistance Test specified in SAE J2192. Briefly, cable ties were immersed in each test fluid for 5 minutes, and then inspected for any signs of degradation over a 72 hour period. As shown in Table 2, no degradation was observed in any of the test fluids.

These and other modifications and variations to the present disclosure may be practiced by those of ordinary skill in the art, without departing from the spirit and scope of the present disclosure. In addition, it should be understood the aspects of the various embodiments may be interchanged, either in whole or in part. Furthermore, those of ordinary skill in the art will appreciate that the foregoing description is by way of example only, and is not intended to limit the disclosure.

What is claimed is:

1. A fastener that is a cable tie, clip, band, harness, tape, clamp, cable tie saddle, or a combination thereof, wherein the fastener includes an injection molded part having a thickness of about 100 millimeters or less, the fastener containing
 a thermoplastic composition formed by melt processing
  (i) linear polyarylene sulfide containing less than about 1 mol. % of cross-linking units based on the total monomer units of the polyarylene sulfide,
  (ii) from 10 wt. % to 35 wt. % of an epoxy-functionalized impact modifier, and
  (iii) from 0.5 wt. % to 2 wt. % of a polyfunctional crosslinking agent that includes a dicarboxylic acid,
  wherein melt processing forms a crosslinked epoxy-functionalized impact modifier that is a reaction product of epoxy-functionalized monomer units and the polyfunctional crosslinking agent, and
  wherein the thermoplastic composition exhibits a tensile elongation at break of about 50% or more as determined in accordance with ISO Test No. 527 at a temperature of 23° C. and at a speed of 50 mm/min,
 wherein the injection molded part exhibits a notched Charpy impact strength of about 3 kJ/m$^2$ or greater as measured according to ISO Test No. 179-1 at a temperature of 23° C., and
 wherein the injection molded part exhibits about 60% or more strength retention following heat aging at 165° C. for 1000 hours.

2. The fastener of claim 1, the injection molded part exhibiting a notched Charpy impact strength of about 8 kJ/m$^2$ or greater as measured according to ISO Test No. 179-1 at a temperature of −30° C.

3. The fastener of claim 1, wherein the injection molded part meets the V-0 flammability standard at a thickness of 0.2 millimeters.

4. The fastener of claim 1, wherein the injection molded part exhibits a flexural modulus of about 2500 MPa or less as determined according to ISO Test No. 178.

5. The fastener of claim 1, wherein the polyarylene sulfide is a polyphenylene sulfide.

6. The fastener of claim 1, wherein the composition comprises one or more fillers.

7. The fastener of claim 6, wherein the one or more fillers comprises fibrous fillers.

8. The fastener of claim 1, wherein the impact modifier includes methacrylic monomer units that contain an epoxy functionality.

9. The fastener of claim 8, wherein the impact modifier further includes α-olefin monomer units.

10. The fastener of claim 9, wherein the impact modifier further includes methacrylic monomers units that are not epoxy-functionalized.

11. The of claim 1, wherein the dicarboxylic acid includes terephthalic acid.

12. The fastener of claim 11, wherein the crosslinking agent is supplied following distribution of the impact modifier with the polyarylene sulfide.

13. The fastener of claim 1, wherein polyarylene sulfides constitute from about 20% wt. % to about 90 wt. % by weight of the composition.

14. The fastener of claim 1, wherein the thermoplastic composition contains an additional polymer.

15. The fastener of claim 14, wherein the additional polymer is a siloxane polymer.

16. The fastener of claim 15, wherein the siloxane polymer is an ultrahigh molecular weight polydimethylsiloxane.

17. The fastener of claim 14, wherein the thermoplastic composition further comprising silica, a silane coupling agent, or a combination thereof.

18. The fastener of claim 14, wherein the additional polymer is a thermoplastic elastomer.

19. The fastener of claim 18, wherein the thermoplastic elastomer has a repeating structure represented by $(A\text{-}B)_n$, wherein A is a hard segment and B is a soft segment.

20. The fastener of claim 19, wherein the thermoplastic elastomer comprises alternating blocks of polyamide and polyether.

21. The fastener of claim 14, wherein the additional polymer constitutes from about 0.1 wt. % to about 30 wt. % of the thermoplastic composition.

22. The fastener of claim 1, wherein the impact modifier constitutes from 15 wt. % to about 35 wt. % of the thermoplastic composition.

23. The fastener of claim 1, wherein the fastener is a cable tie.

24. The fastener of claim 23, wherein the cable tie has a head and distal end, wherein the head of the tie defines a slot that is configured to receive the distal end.

25. The fastener of claim 24, wherein the cable tie further includes a series of teeth.

26. The fastener of claim 25, wherein the slot includes a pawl that engages the teeth.

\* \* \* \* \*